United States Patent [19]

Warnke

[11] 4,216,876
[45] Aug. 12, 1980

[54] PRESSURE OPERATED COUPLER

[75] Inventor: Hans Warnke, Herne, Fed. Rep. of Germany

[73] Assignee: Klockner-Werke AG, Duisburg, Fed. Rep. of Germany

[21] Appl. No.: 54,445

[22] Filed: Jul. 3, 1979

[30] Foreign Application Priority Data

Aug. 18, 1978 [DE] Fed. Rep. of Germany ....... 2836127

[51] Int. Cl.² .............................................. B65D 45/32
[52] U.S. Cl. .................................... 220/319; 220/211; 220/315
[58] Field of Search ....................... 220/211, 315, 319; 292/256.67, 256.69

[56] References Cited

U.S. PATENT DOCUMENTS

| 3,077,360 | 2/1963 | Israel | 220/315 X |
| 4,119,238 | 10/1978 | Ja'afar et al. | 220/211 |
| 4,140,240 | 2/1979 | Platts | 220/319 X |

Primary Examiner—George T. Hall
Attorney, Agent, or Firm—Watson, Cole, Grindle & Watson

[57] ABSTRACT

A coupler for use in clamping down a lid over a pressure vessel has a pair of clamping jaws movable toward and away from one another respectively between clamping and unclamping positions. The cylinder of a pressure-operated piston and cylinder unit is pivotally connected to support plates extending outwardly of one of the jaws, and the piston of such unit is pivotally connected to one end of the pair of linkages pivotally mounted at the other end thereof to the other of the clamping jaws. Curved slots defining tracks are provided in the support plates, and rollers are located on the linkages in engagement with the slots for controlling simultaneous movement of the clamping jaws toward and away from one another upon actuation of the piston and cylinder unit.

6 Claims, 5 Drawing Figures

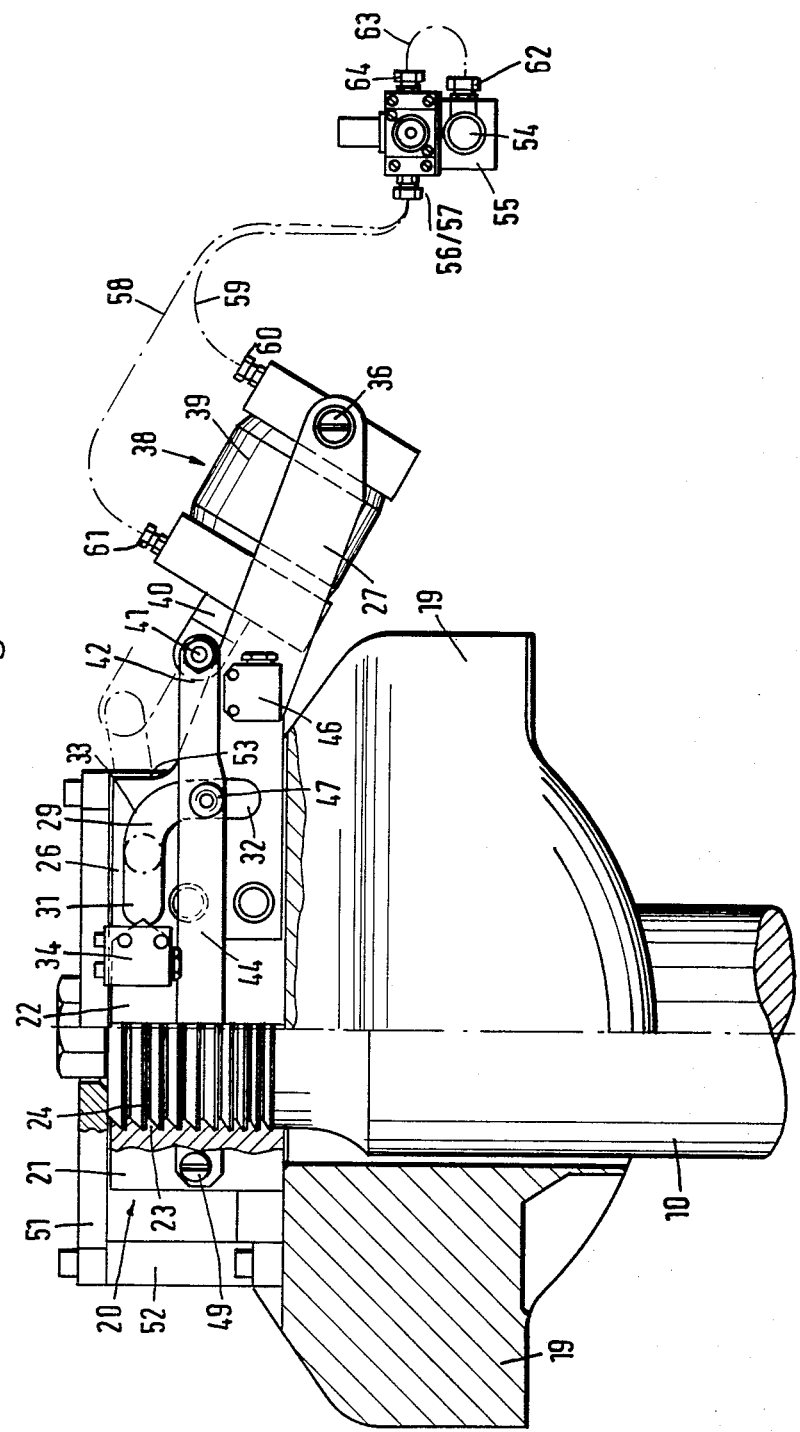

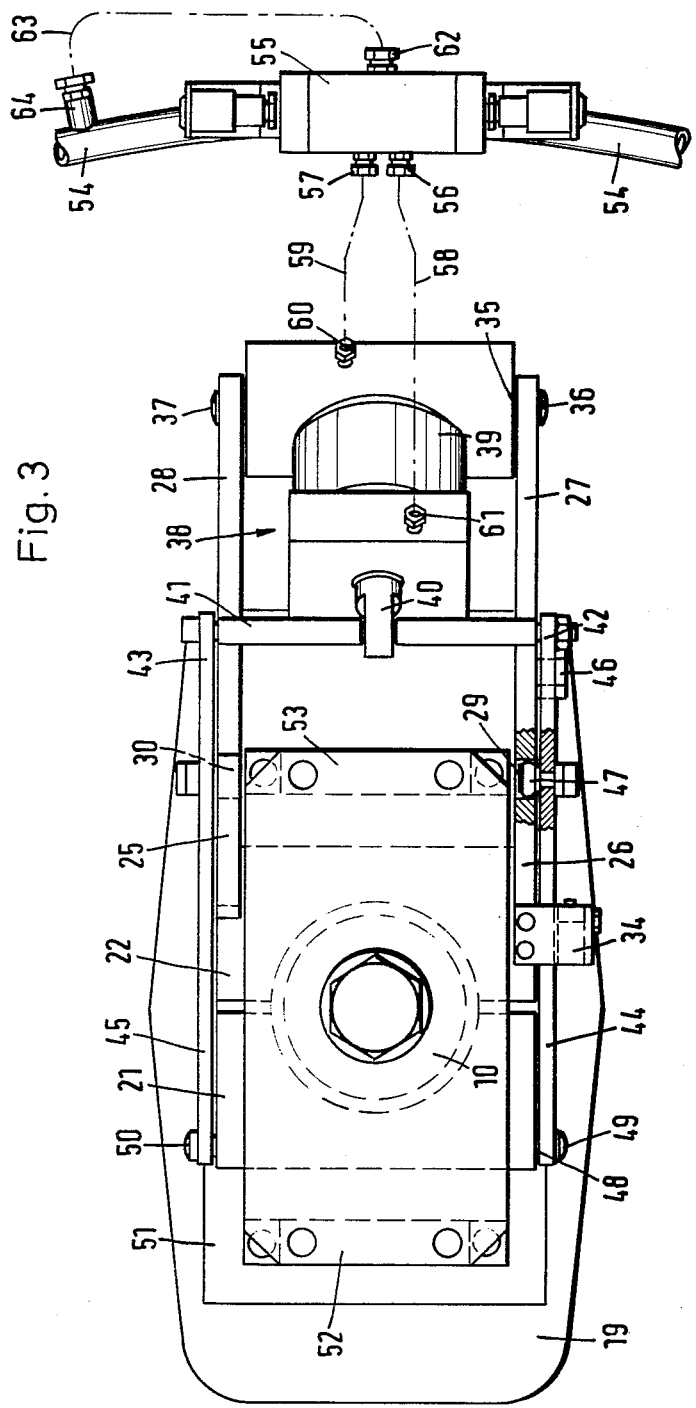

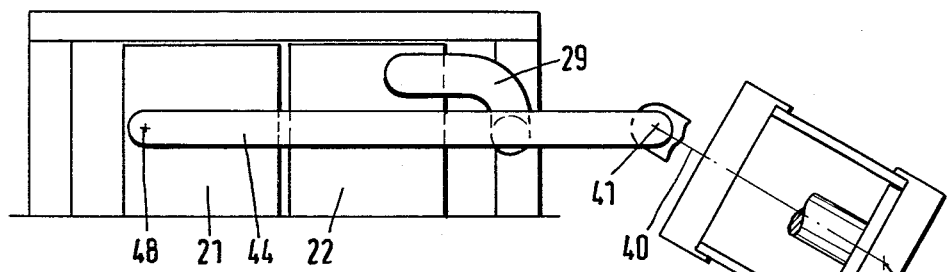
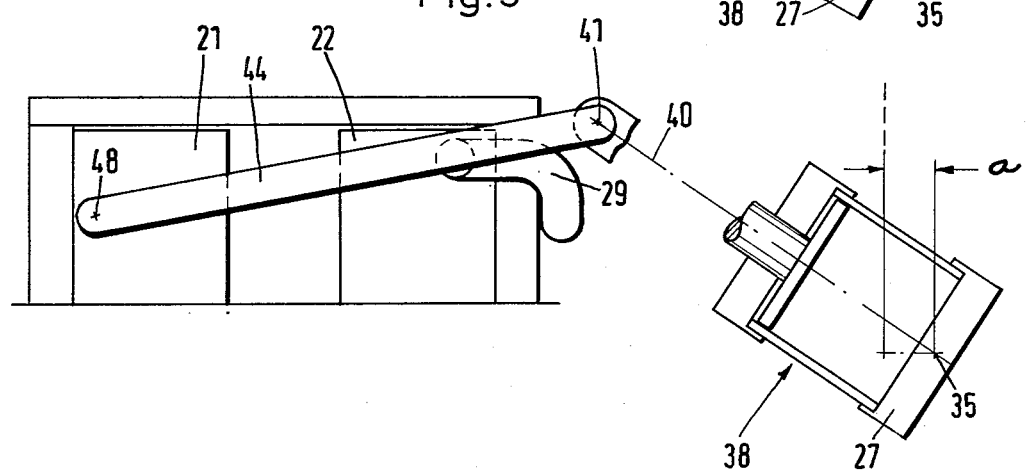

PRESSURE OPERATED COUPLER

BACKGROUND OF THE INVENTION

This invention relates generally to a coupler for a screw clamping device provided for the opening and closing of pressure vessels, and more particularly to such a coupler which includes a pair of opposing clamping jaws having grooved inner walls engageable with annular grooves provided on an elongated bolt which holds down a cover onto the pressure vessel. Both clamping jaws are actuated by a single pressure-operated piston and cylinder unit.

In known couplers provided to facilitate the opening and closing of pressure vessels, opposed clamping jaws must be moved separately into and out of clamping engagement with an elongated bolt provided for securing the cover to the pressure vessel. Independent movement of each clamping jaw is carried out by means of separate pneumatically operated piston and cylinder units as disclosed in German Patent No. 1,300,467, commonly owned herewith. Such an arrangement, however, is relatively complex, is somewhat cumbersome to operate and is basically uneconomical. The terminal clamping and unclamping positions of the jaws, in accordance with the prior art, must be carefully monitored by means of, for example, electric terminal switches, light switches or pneumatic sensors for ensuring the fully clamping and unclamped positions of the jaws. Such monitoring devices, which are costly and cumbersome, were required to coincide the terminal ends of the clamping and unclamping positions with that of the monitoring function.

SUMMARY OF THE INVENTION

The present invention relates to a coupler for use in clamping a ring over an elongated bolt provided for securing a cover to a pressure vessel, the coupler including a pair of clamping jaws movable between clamping and unclamping positions by means of a single pressure-operated unit so as to effect a positive, self-locking and controllable connection between the clamping jaws and the boiler bolt.

More particularly, such a pressure-operated unit is of the piston and cylinder type which lies at an angle to the plane containing the movement of the clamping jaws, the cylinder of such unit being pivotally connected to support plates extending outwardly of one of the jaws, and the piston of such unit being pivotally connected to linkages which are themselves pivotally connected to the other of the clamping jaws. Thus, the clamping jaws are moved together practically simultaneously into and from their clamping position. Independently movable clamping jaws as in the prior art need not therefore be so closely monitored as to assure full clamping and full unclamping by the jaws moving independently at perhaps different intervals.

One of the clamping jaws of the invention, such as the outer one, may have plate supports mounted on opposite sides, the pressure-operated piston and cylinder unit being disposed between these plates and the cylinder thereof being pivotally mounted on a tie rod interconnecting the free ends of these support plates.

Further in accordance with the invention, these support plates are provided with aligned curved tracks having straight portions at opposite ends respectively lying parallel to and perpendicular to the plane in which the clamping jaws move. These portions are interconnected by a curved portion, and fixed rollers on the linkages engage these tracks for controlling the opening and closing operations of the clamping jaws.

Other objects, advantages and novel features of the invention will become more apparent from the following detailed description of the invention when taken in conjunction with the accompanying drawings.

BRIEF DESCRIPTION OF THE DRAWINGS

FIG. 2 is an enlarged detailed view looking in the direction of arrow X of FIG. 1;

FIG. 3 is a top plan view of FIG. 2;

FIG. 4 is a schematic illustration in side elevation of the clamping position of the clamping jaws; and FIG. 5 is a view similar to FIG. 4 showing the unclamped position of the clamping jaws.

DETAILED DESCRIPTION OF THE INVENTION

Figure 1:
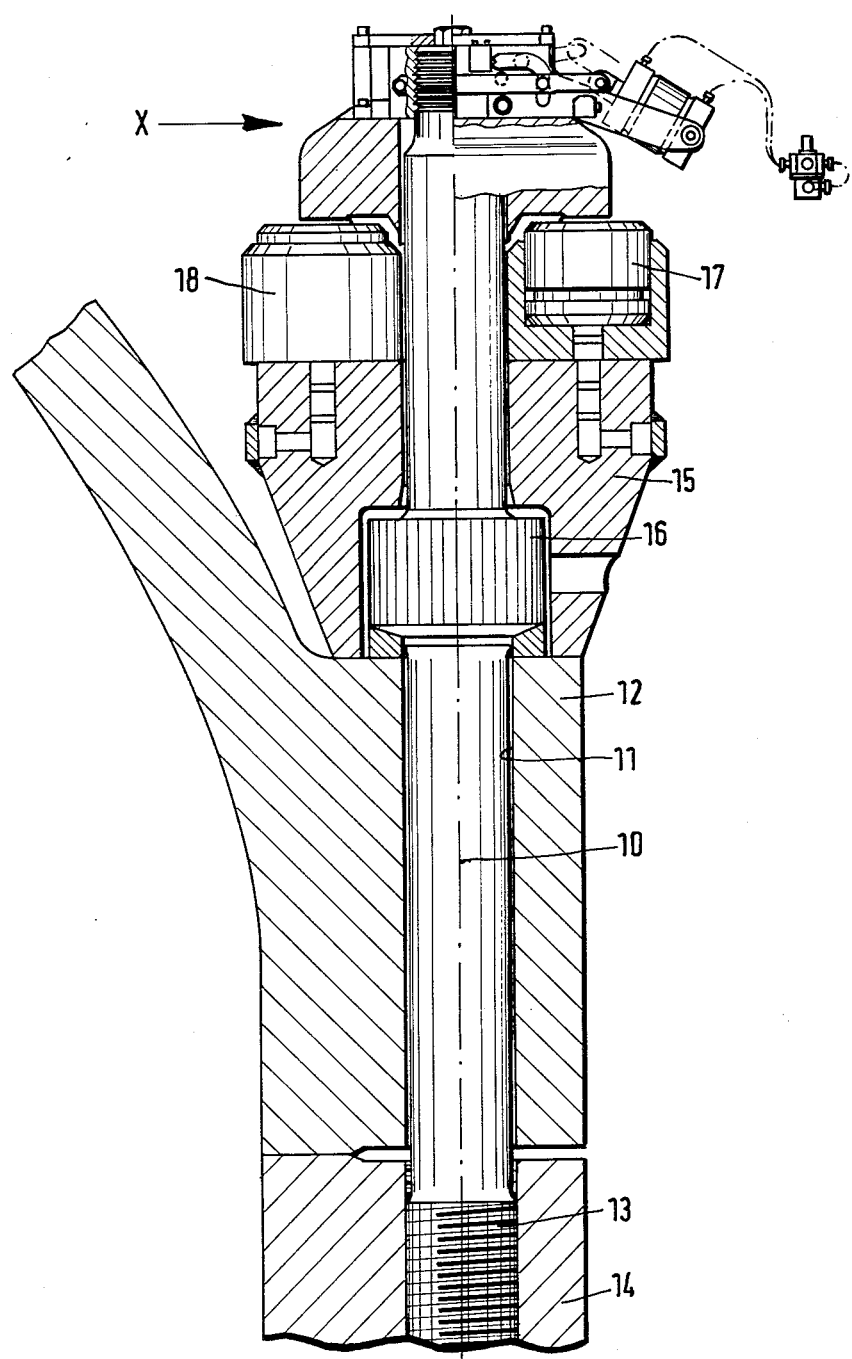
FIG. 1 is a vertical sectional view of a lid mounted on a pressure vessel, both partially shown, and clamped in place by the coupler assembly according to the invention.

Turning now to the drawings wherein like reference characters refer to like and corresponding parts throughout the several views, the coupler assembly according to the invention is disclosed for use with screw clamping devices provided for the closing and opening of pressure vessels. Thus, an elongated boiler bolt 10 is disposed in an elongated bore 11 of a flange 12 of a cover, the bolt being in threaded engagement at its lower end 13 with a suitable opening provided in a boiler flange 14 of the pressure vessel. A clamping ring 15 overlies flange 12 and a hold-down boiler nut 16 is provided on the bolt, the ring supporting cocking cylinders 17 and 18 which are braced against a pressure bridge 19.

A coupler assembly, generally designated 20, is disposed above pressure bridge 19 and comprises an inner clamping jaw 21 and an outer clamping jaw 22. The clamping jaws have arcuate inner walls 23 in confronting relationship and have annular grooves thereon (FIGS. 1 and 2). These grooves engage like annular grooves 24 provided on the upper free end of bolt 10, in the clamping position of FIGS. 2, 3 and 4. And, grooved walls 23 each have a radius substantially equal to the radii of annular grooves 24.

Support plates 25 and 26 are mounted on opposite sides of outer clamping jaw 22, the support plates terminating in ends 27 and 28 lying outwardly of clamping jaw 22 and sloping slightly downwardly. Curved tracks 29 and 30 are provided in the support plates and are defined by elongated curved slots with upper end portions 31 thereof lying horizontal, i.e., parallel to the plane in which the clamping jaws are adapted to move. The lower end portions 32 of the slots are vertically disposed, i.e., perpendicular to the plane in which the clamping jaws are adapted to move, and curved portions 33 interconnect straight portions 31 and 32. And, a terminal feeler 34 is mounted on one of the support plates at the end of portion 31 for a purpose to be hereinafter described.

A pressure-operated piston and cylinder unit 38 (hydraulic or pneumatic) is disposed between ends 27 and 28, cylinder 39 of this unit being mounted on ends 27 and 28 for pivotal movement about an axis 36 by means of screws 36 and 37. Piston rod 40 of unit 38 is pivotally mounted on a tie rod 41 (FIG. 3) which in turn is pivotally mounted on outer ends 42 and 43 of rods or linkages 44 and 45. A terminal switch or feeler 46 is mounted on support plate 26 adjacent linkage 44 and functions as will be described later. Rollers 47 are mounted for rotation about fixed axes on linkages 44 and 45, and extend into slots 29 and 30 for engagement with the wall thereof, as shown in FIG. 3. And, the inner ends of linkages 44 and 45 are pivotally mounted to clamping jaw 21 for movement about an axis 48 by means of screws 49 and 50. The linkages therefore lie along opposite sides of both clamping jaws and extend outwardly of jaw 22 for linking up with the piston of unit 38 as in the manner aforedescribed.

A cover sheet 51 is mounted over the clamping jaws, and terminal stops or abutment walls 52 and 53 are spaced, relative to the clamping position as shown in FIG. 2, from the outer ends of the clamping jaws.

An annular pressure hose 54 is provided for supplying unit 38 with a pressure medium, a multiple path valve 55 being located in hose 54. Pressure terminals 56 and 57 extend from valve 55, pressure lines 58 and 59 are connected to these terminals as well as to terminals 61 and 60 respectively provided on opposite sides of the piston head located in unit 38. Also, a pressure line 63 branches off from a terminal 62 of valve 55 and leads to a connection 64 of annular hose 54.

The clamping position of the jaws into engagement with annular grooves 24 of bolt 10 is shown in FIGS. 1 to 4. In order to move the clamping jaws away from one another into an unclamping position of FIG. 4, the piston and cyliner unit 38 is operated by supplying pressure line 59 with a pressure medium to thereby extend piston rod 40 outwardly of cylinder 39 whereupon the tie rod 41 and rolls 47 are moved vertically upwardly in a straight line as guided by straight end portion 32 of the aligned tracks 29. The tie rod and rollers continue to follow the path of curved intermediate portion 29 and straight horizontal portions 31 of the curved tracks and, because of the pivotal connections at 36 and 37, 41, 49 and 50, and because of the increased pressure within the unit acting on the inside of cylinder 39, movement of jaw 21 to the left and jaw 22 to the right is effected out of engagement with annular grooves 24. The unclamping position of the clamping jaws, the piston rod, the tie rod, the linkages and rollers is shown in phantom outline in FIG. 2 and in solid outline in FIG. 5. And, pivot axis 35 moves to the right a distance a equal to the moved distance of each clamping jaw, as the clamping jaws are moved from their clamping position of FIG. 4 to their unclamping position of FIG. 5. The clamping jaws move away from one another during this unclamping operation practically simultaneously, i.e., clamping jaw 21 moves first in the illustrated embodiment and then clamping jaw 22 moves shortly thereafter. It should be pointed out that it is immaterial as to which of the clamping jaws is moved slightly ahead of the other. Thus, the piston and cylinder unit, linkages, support plates, etc. may be mounted to the opposite side of that shown in the drawings. For example, unit 38 may be idsposed adjacent jaw 21, the grooved support plates may be mounted on this clamping jaw, and linkages 44 and 45 may be mounted on the other clamping jaw 22. Outer clamping jaw 22 will therefore be made to first move slightly ahead of jaw 21 into an unclamping position in the same manner as aforedescribed.

After the clamping jaws have been moved away from one another into the unclamping position of FIG. 5, a pressure medium is ported through line 58 and connection 61 into cylinder 39 for acting on the opposite face of the piston head while at the same time the pressurized medium within the cylinder is ported out through connection 60 and line 59. Piston 40 will therefore be retracted back into the cylinder and, with pressure acting on both this opposite face of the piston head and on the interior of the cylinder, the clamping jaws will be moved toward one another from the position of FIG. 5 back into the position of FIG. 4.

Portions 31 and 32 of the tracks are slightly longer than required to insure a tight clamping of the jaws on the boiler bolt. And, feelers 34 and 46 are so positioned as to be actuated respectively by a roller 47 and by rod 44 at the terminal ends of the clamping and unclamping operations. These respective positions of the clamping jaws may therefore be effectively identified.

Obviously, many modifications and variations of the present invention are made possible in the light of the above teachings. It is therefore to be understood that within the scope of the appended claims, the invention may be practiced otherwise than as specifically described.

I claim:

1. In a pressure vessel having a cover and at least one elongated bolt for securing said cover on to said vessel, said bolt having annular grooves at an outer end thereof, a clamping ring disposed on said bolt, and a coupler asssembly for clamping said ring on to said bolt, the improvement wherein said coupler assembly comprises an opposing pair of clamping jaws having grooved inner walls engageable with said annular grooves in a clamping position and being disengageable from said grooves in an unclamping position, said jaws being movable in a common plane toward and away from one another between said positions, a pressure-operated piston and cylinder unit, support means extending outwardly of one of said jaws, the cylinder of said unit being pivotally mounted on said support means, linkages pivotally connected at one end to the other of said jaws, the piston of said unit being pivotally connected to the opposite ends of said linkages, and said unit being disposed at an angle to said common plane, whereby said jaws are capable of being moved toward and away from one another between said positions upon actuation of said unit causing said piston and cylinder to move opposite one another.

2. In the vessel according to claim 1, wherein said support means comprise a pair of plates mounted on opposite sides of said one jaw, said unit being disposed between said plates.

3. In a vessel according to claim 2, wherein said cylinder of said unit is pivotally mounted at the free ends of said plates.

4. In a vessel according to claim 3, wherein elongated slots defining aligned tracks are provided in said plates, portions at opposite ends of said slots lying respectively parallel to and perpendicular to said common plane, curved intermediate portions interconnecting said opposite end portions, and rollers mounted on said linkages in engagement with said tracks for movement therealong during movement of said jaws between said positions, whereby said tracks serve to guide the pivotal movement of said linkages, said piston and cylinder.

5. In a vessel according to claim 4, wherein said piston and cylinder unit lies adjacent said one jaw, said linkages lying on opposite sides of both said jaws and extending from said other jaw toward said unit, a tie rod interconnecting said opposite ends of said linkages, said piston being pivotally connected to said tie rod.

6. In the vessel according to claim 5, wherein terminal feelers are mounted on one of said plates at said opposite ends of said slots for sensing said clamping and said unclamping positions upon contact therewith by one of said linkages and by one of said rollers mounted thereon.

* * * * *